(12) United States Patent
Takagi et al.

(10) Patent No.: US 12,007,183 B2
(45) Date of Patent: Jun. 11, 2024

(54) HEAT EXCHANGER

(71) Applicant: DENSO CORPORATION, Kariya (JP)

(72) Inventors: Yusuke Takagi, Kariya (JP); Kenshiro Muramatsu, Kariya (JP); Satoshi Nita, Kariya (JP)

(73) Assignee: DENSO CORPORATION, Kariya (JP)

( * ) Notice: Subject to any disclaimer, the term of this patent is extended or adjusted under 35 U.S.C. 154(b) by 319 days.

(21) Appl. No.: 17/487,905

(22) Filed: Sep. 28, 2021

(65) Prior Publication Data

US 2022/0018614 A1 Jan. 20, 2022

Related U.S. Application Data

(63) Continuation of application No. PCT/JP2020/013344, filed on Mar. 25, 2020.

(30) Foreign Application Priority Data

Apr. 1, 2019 (JP) ................................. 2019-070170

(51) Int. Cl.
*F28F 3/06* (2006.01)
*F28F 3/08* (2006.01)

(52) U.S. Cl.
CPC . *F28F 3/06* (2013.01); *F28F 3/08* (2013.01)

(58) Field of Classification Search
CPC ............ F28F 3/08; F28F 9/0282; F28D 9/005
See application file for complete search history.

(56) References Cited

U.S. PATENT DOCUMENTS

| 4,370,868 | A | 2/1983 | Kim et al. |
| 5,245,843 | A | 9/1993 | Shimoya et al. |
| 6,340,054 | B1 * | 1/2002 | Schwarz .................. F28F 3/10 165/175 |
| 7,690,420 | B2 * | 4/2010 | Horte ..................... F28D 9/005 165/167 |
| 9,121,643 | B2 * | 9/2015 | Schaefer ............. H01M 10/663 |
| 10,989,481 | B2 * | 4/2021 | Crawford ............. F28D 9/0093 |
| 2008/0105420 | A1 * | 5/2008 | Taras .................. F28D 1/05366 165/174 |
| 2016/0010929 | A1 | 1/2016 | Takahashi et al. |
| 2019/0011198 | A1 * | 1/2019 | Feldkeller ........... G03F 7/70925 |
| 2019/0033005 | A1 | 1/2019 | Romlund |

FOREIGN PATENT DOCUMENTS

| JP | H05196321 A | 8/1993 |
| JP | 2001082883 A | 3/2001 |
| JP | 2015059669 A | 3/2015 |

* cited by examiner

*Primary Examiner* — Lionel Nouketcha
(74) *Attorney, Agent, or Firm* — Harness, Dickey & Pierce, P.L.C.

(57) ABSTRACT

A heat exchanger includes a fin arranged in a first passage and a tubular tank portion formed so as to penetrate plate members stacked in a stacking direction. An inflow port is formed in a peripheral wall of the tank portion to allow a refrigerant to flow into the first passage. When the fin is arranged in a fin installation portion in the first passage, a passage reduction portion is formed at the inflow port and is narrower than a width of the fin installation portion in the stacking direction.

4 Claims, 4 Drawing Sheets

HEAT EXCHANGER

CROSS-REFERENCE TO RELATED APPLICATIONS

The present application is a continuation application of International Patent Application No. PCT/JP2020/013344 filed on Mar. 25, 2020, which designated the U.S. and claims the benefit of priority from Japanese Patent Application No. 2019-070170 filed on Apr. 1, 2019. The entire disclosures of all of the above applications are incorporated herein by reference.

TECHNICAL FIELD

The present disclosure relates to a heat exchanger.

BACKGROUND ART

A heat exchanger includes plate members stacked with each other. A refrigerant passage through which refrigerant flows and a cooling water passage through which cooling water flows are formed between the plate members.

SUMMARY

According to one aspect of the present disclosure, a heat exchanger includes: plate members stacked with each other in a stacking direction so as to define first passages and second passages, heat being exchanged between a refrigerant flowing through the first passage and a fluid flowing through the second passage; a fin arranged in a fin installation portion in the first passage; and a tubular tank portion formed so as to penetrate the plate members in the stacking direction. An inflow port for allowing the refrigerant to flow into the first passage is formed in a peripheral wall of the tank portion. A passage reduction portion is formed at the inflow port, and is narrower than a width of the fin installation portion in the stacking direction.

DESCRIPTION OF EMBODIMENT

Figure 1:
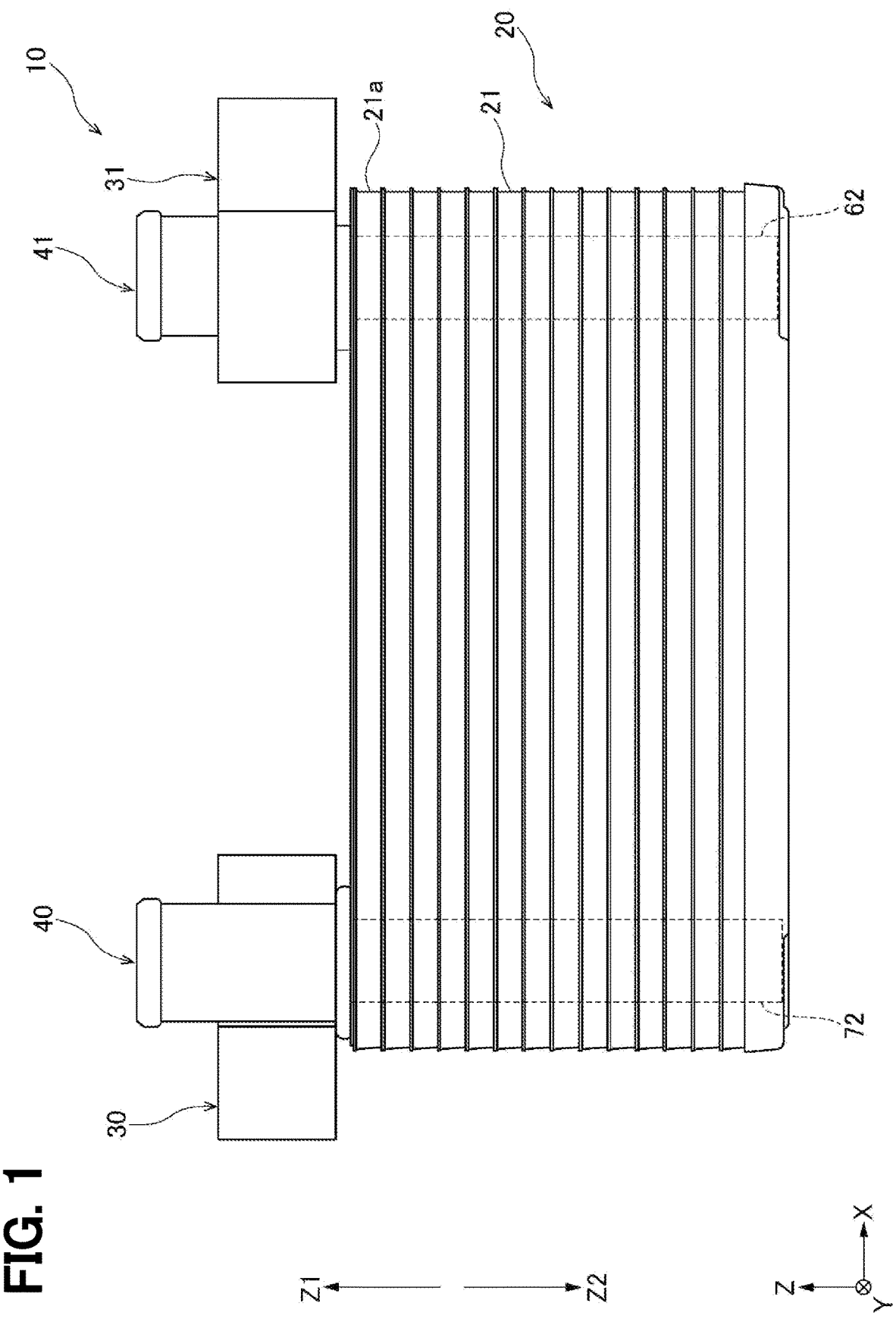
FIG. 1 is a front view illustrating a heat exchanger according to a first embodiment.

To begin with, examples of relevant techniques will be described.

Conventionally, a heat exchanger has a structure in which plate members are stacked with each other. A refrigerant passage through which refrigerant flows and a cooling water passage through which cooling water flows are formed between the plate members. The stacked structure of the plate members has a refrigerant tank portion that distributes the refrigerant flowing from the inflow port to the refrigerant passages, or collects the refrigerant flowing through the refrigerant passages to discharge the refrigerant from the discharge port. Further, the stacked structure of the plate members has a cooling water tank portion that distributes the cooling water flowing from the inflow port to the cooling water passages, or collects the cooling water flowing through the cooling water passages to discharge from the discharge port. In the heat exchanger, heat is exchanged between the refrigerant flowing through the refrigerant passage and the cooling water flowing through the cooling water passage.

In the heat exchanger, the refrigerant flowing into the refrigerant tank portion from the inflow port may be in a two-phase state in which a gas phase refrigerant and a liquid phase refrigerant are mixed. When the refrigerant flowing into the refrigerant tank portion is in the two-phase state, the liquid phase refrigerant tends to flow toward the downstream side of the refrigerant tank portion due to the inertia of the flow. Therefore, among the refrigerant passages, the liquid phase refrigerant tends to flow in the refrigerant passage near the downstream side of the refrigerant tank portion. If the distribution of the refrigerant among the refrigerant passages is biased in this way, the heat exchange performance of the heat exchanger may be significantly deteriorated.

The present disclosure provides a heat exchanger capable of improving the distributability of the refrigerant.

According to one aspect of the present disclosure, a heat exchanger includes: plate members stacked with each other in a stacking direction so as to define first passages and second passages, heat being exchanged between a refrigerant flowing through the first passage and a fluid flowing through the second passage; a fin arranged in a fin installation portion in the first passage; and a tubular tank portion formed so as to penetrate the plate members in the stacking direction. An inflow port for allowing the refrigerant to flow into the first passage is formed in a peripheral wall of the tank portion. A passage reduction portion is formed at a position between the inflow port and the fin installation portion, and is narrower than a width of the fin installation portion in the stacking direction.

According to another aspect of the present disclosure, a heat exchanger includes: plate members stacked with each other in a stacking direction so as to define first passages and second passages, heat being exchanged between a refrigerant flowing through the first passage and a fluid flowing through the second passage; and a tubular tank portion formed so as to penetrate the plate members in the stacking direction. An inflow port for allowing the refrigerant to flow into the first passage is formed in a peripheral wall of the tank portion, and a passage reduction portion is formed at a position between the first passage and the inflow port to reduce the passage cross-sectional area.

Accordingly, since the passage reduction portion is formed between the inflow port and the fin installation portion or between the first passage and the inflow port, it becomes difficult for the refrigerant to flow from the tank portion to the first passage. That is, it is possible to increase the resistance in flow of the refrigerant flowing from the tank portion into the first passage. As a result, even if the distribution of the refrigerant is biased in the tank portion due to the inertia of the flow of the refrigerant, the refrigerant can be made to flow from a portion where the flow rate of the refrigerant tends to increase to a portion where the flow rate of the refrigerant tends to decrease. As a result, the distributability of the refrigerant can be improved.

Hereinafter, embodiments will be described with reference to the drawings. To facilitate understanding, identical elements are designated with identical symbols in the drawings where possible with the duplicate description omitted.

First Embodiment

A heat exchanger 10 of the first embodiment shown in FIGS. 1 to 3 will be described. The heat exchanger 10 can be used, for example, as an evaporator that evaporates refrigerant by exchanging heat between the refrigerant circulating in a refrigeration cycle of an air conditioner mounted on a vehicle and the cooling water. In this embodiment, the cooling water corresponds to a fluid that exchanges heat with the refrigerant.

As shown in FIG. 1, the heat exchanger 10 includes a heat exchange core portion 20, a refrigerant inflow portion 30, a refrigerant discharge portion 31, a cooling water inflow portion 40, and a cooling water discharge portion 41.

The heat exchange core portion 20 includes plate members 21 stacked in the Z direction. Hereinafter, the Z direction is also referred to as "plate stacking direction Z". Further, one side of the plate stacking direction Z is referred to as "Z1 direction", and the other side of the plate stacking direction Z is referred to as "Z2 direction". A refrigerant passage through which the refrigerant flows and a cooling water passage through which the cooling water flows are provided between the plate members 21. The refrigerant passages and the cooling water passages are alternately arranged in the heat exchanger 10.

Figure 2:
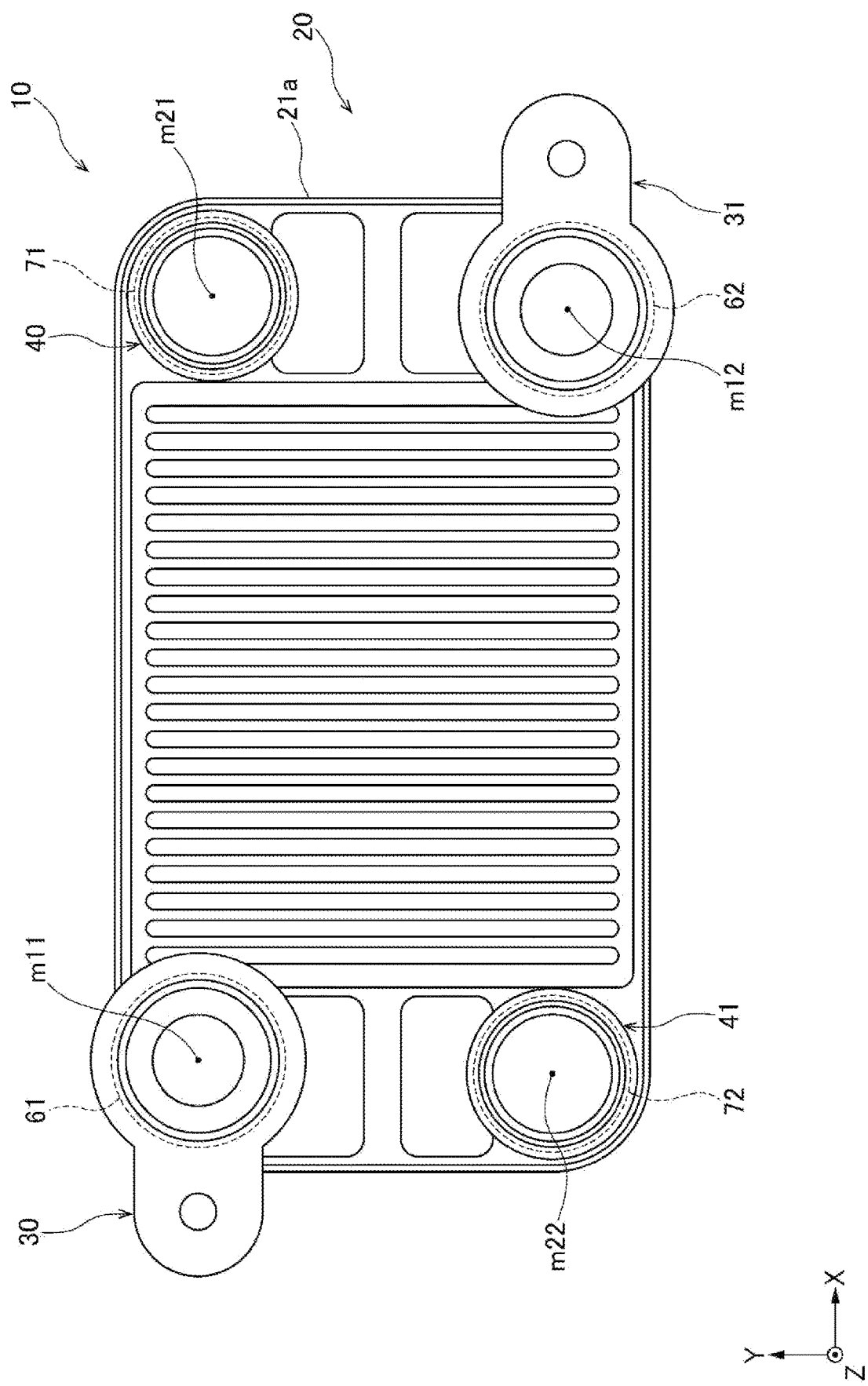
FIG. 2 is a plan view illustrating the heat exchanger of the first embodiment.
Figure 3:
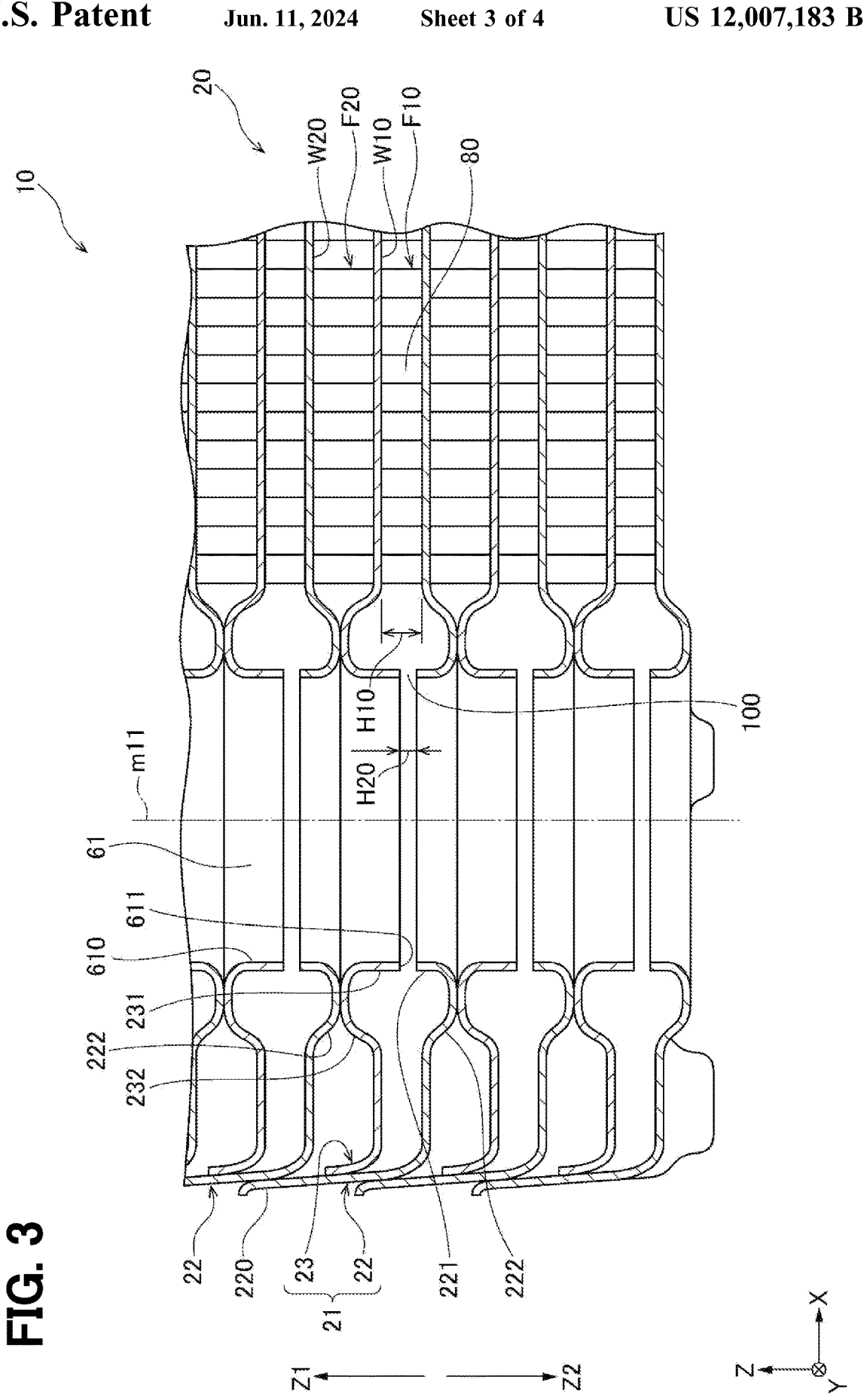
FIG. 3 is a cross-sectional view of the heat exchanger of the first embodiment.

As shown in FIG. 2, the heat exchange core portion 20 has a substantially rectangular shape in the cross-section orthogonal to the plate stacking direction Z. Hereinafter, the longitudinal direction and the lateral direction of the heat exchange core portion 20 are referred to as "X direction" and "Y direction", respectively.

The outermost plate member 21a is arranged at the outermost end of the plate members 21 in the Z1 direction, and has four corners. The refrigerant inflow portion 30 and the refrigerant discharge portion 31 are respectively located at two corners diagonally located, among the four corners. Further, the cooling water inflow portion 40 and the cooling water discharge portion 41 are respectively provided at the remaining corner portions located diagonally.

As shown in FIGS. 1 and 2, a first refrigerant tank portion 61 is formed inside the heat exchange core portion 20 so as to extend from the refrigerant inflow portion 30 in the Z2 direction. A second refrigerant tank portion 62 is formed so as to extend from the refrigerant discharge portion 31 in the Z2 direction. The first refrigerant tank portion 61 is formed in a tubular shape with the axis m11. The second refrigerant tank portion 62 is formed in a tubular shape with the axis m12. Further, a first cooling water tank portion 71 is formed inside the heat exchange core portion 20 so as to extend from the cooling water inflow portion 40 in the Z2 direction. A second cooling water tank portion 72 is formed so as to extend from the cooling water discharge portion 41 in the Z2 direction. The first cooling water tank portion 71 is formed in a tubular shape with the axis m21. The second cooling water tank portion 72 is formed in a tubular shape with the axis m22. Each of the tank portions 61, 62, 71, 72 is formed so as to penetrate the plate members 21 in the plate stacking direction Z.

In the heat exchanger 10, refrigerant in two-phase state, i.e., gas phase and liquid phase, flows into the first refrigerant tank portion 61 from the refrigerant inflow portion 30, and cooling water flows from the cooling water inflow portion 40 into the first cooling water tank portion 71. The refrigerant that has flowed into the first refrigerant tank portion 61 is distributed to the refrigerant passages of the heat exchange core portion 20. The refrigerant that has flowed through the refrigerant passages is collected in the second refrigerant tank portion 62 and then discharged from the refrigerant discharge portion 31. Further, the cooling water flowing into the first cooling water tank portion 71 is distributed to the cooling water passages of the heat exchange core portion 20. The cooling water that has flowed through the cooling water passages is collected in the second cooling water tank portion 72 and then discharged from the cooling water discharge portion 41. In the heat exchanger 10, heat exchange is performed between the refrigerant flowing through the refrigerant passage and the cooling water flowing through the cooling water passage, so that the refrigerant is heated and evaporated.

Next, the specific structure of the heat exchange core portion 20 will be described. As shown in FIG. 3, the heat exchange core portion 20 includes the plate member 21, a refrigerant fin F10, and a cooling water fin F20, which are made of a metal material such as an aluminum alloy.

The plate member 21 has an outer plate 22 and an inner plate 23.

The outer plate 22 is a plate-shaped member having a substantially rectangular shape in the cross-section orthogonal to the plate stacking direction Z. An outer peripheral edge portion of the outer plate 22 has an overhanging portion 220 projecting in the Z1 direction. The outer plates 22 are stacked and arranged so that the overhanging portions 220 project in the Z1 direction. The overhanging portions 220 of the outer plates 22 are joined to each other by brazing.

The outer plate 22 has a burring portion 221 formed by burring. The burring portion 221 is formed in a tubular shape so as to project in the Z1 direction about the axis m11, which is the central axis of the first refrigerant tank portion 61. A protrusion 222 protruding in the Z2 direction is formed in a part of the outer plate 22 corresponding to the base end of the burring portion 221.

The inner plate 23 is a plate-shaped member having a substantially rectangular shape in the cross-section orthogonal to the plate stacking direction Z. The inner plate 23 is arranged inside the overhanging portion 220 of the outer plate 22. The inner plate 23 is arranged between the outer plates 22 and 22 adjacent to each other. The outer peripheral edge portion of the inner plate 23 is joined to the inner peripheral portion of the overhanging portion 220 of the outer plate 22 by brazing. The inner plate 23 divides a space formed between the adjacent outer plates 22 and 22 into a refrigerant passage W10 and a cooling water passage W20 that are not communicated with each other. The refrigerant passage W10 and the cooling water passage W20 are independent from each other. More specifically, a space formed between the inner plate 23 and the outer plate 22 adjacent to the inner plate 23 in the Z2 direction defines the refrigerant passage W10. Further, a space formed between the inner plate 23 and the outer plate 22 adjacent to the inner plate 23 in the Z1 direction forms the cooling water passage W20. In the present embodiment, the refrigerant passage W10 corresponds to a first passage, and the cooling water passage W20 corresponds to a second passage.

The refrigerant fin F10 is arranged in the refrigerant passage W10. The refrigerant fin F10 is arranged in a "fin installation portion 80" in the refrigerant passage W10. Similarly, the cooling water fin F20 is arranged in the cooling water passage W20. Each of the refrigerant fin F10 and the cooling water fin F20 is made of, for example, offset fin. The refrigerant fin F10 increases the heat transfer area for the refrigerant flowing through the refrigerant passage W10. The cooling water fin F20 increases the heat transfer area for the cooling water flowing through the cooling water passage W20. The fins F10 and F20 improve the heat exchange efficiency between the refrigerant and the cooling water.

The inner plate 23 has a burring portion 231 formed by burring at a position corresponding to the burring portion 221 of the outer plate 22. The burring portion 231 is formed in a tubular shape so as to project in the Z2 direction about the axis m11, which is the central axis of the first refrigerant tank portion 61. A protrusion 232 protruding in the Z2 direction is formed in a part of the inner plate 23 corresponding to the base end of the burring portion 231.

The protrusion 232 of the inner plate 23 is joined to the protrusion 222 of the outer plate 22 in the Z1 direction by brazing. As a result, the burring portion 221 of the outer plate 22 and the burring portion 231 of the inner plate 23 form the first refrigerant tank portion 61 shaped in a tubular space having the axis m11. The burring portion 221 of the outer plate 22 and the burring portion 231 of the inner plate 23 form a peripheral wall 610 of the first refrigerant tank portion 61. Further, the cooling water passage W20 and the first refrigerant tank portion 61 are partitioned from each other by joining the protrusion 222 of the outer plate 22 and the protrusion 232 of the protrusion 232 of the inner plate 23 to each other. Therefore, the refrigerant flowing through the first refrigerant tank portion 61 does not flow into the cooling water passage W20.

A clearance is formed between the tip end of the burring portion 221 of the outer plate 22 and the tip end of the burring portion 231 of the inner plate 23. The clearance forms the inflow port 611 for the refrigerant that has flowed into the first refrigerant tank portion 61 to be distributed and flows into the refrigerant passages W10.

In the heat exchanger 10, the fin installation portion 80 of the refrigerant passage W10 has the width "H10" in the plate stacking direction Z, and the width H20 of the inflow port 611 is narrower than the width H10 of the fin installation portion 80. Therefore, in the heat exchanger 10, the inflow port 611 is a passage reduction portion 100 narrower than the width H10 of the fin installation portion 80.

According to the heat exchanger 10 of the present embodiment, operations and effects described in the following items (1) to (3) can be obtained.

(1) The refrigerant that has flowed from the refrigerant inflow portion 30 into the first refrigerant tank portion 61 tends to flow toward the downstream side of the first refrigerant tank portion 61 due to inertia of the flow. In the heat exchanger 10 of the present embodiment, even when a larger amount of refrigerant flows toward the downstream side of the first refrigerant tank portion 61 due to inertia, since the width H20 of the inflow port 611 is narrow, it becomes difficult for the refrigerant to flow from the inflow port 611 toward the fin installation portion 80 of the refrigerant passage W10, due to the flow resistance applied to the refrigerant. As a result, even if the flow rate distribution of the refrigerant is biased in the first refrigerant tank portion 61 due to inertia of the flow of refrigerant, the distribution of refrigerant is shifted from the downstream portion where the flow rate of the refrigerant is large to the upstream portion where the flow rate of the refrigerant is small. Thus, the distributability of the refrigerant can be improved.

(2) The passage reduction portion 100 narrower than the width H10 of the fin installation portion 80 is formed at the inflow port 611. Accordingly, the passage reduction portion 100 can be easily formed in the heat exchanger 10.

(3) The passage reduction portion 100 is formed by the burring portions 221, 231 of the plate member 21. More specifically, the passage reduction portion 100 is provided between the two burring portions 221, 231 formed on the outer plate 22 and the inner plate 23, respectively. Accordingly, the passage reduction portion 100 can be easily formed in the heat exchanger 10.

Second Embodiment

A heat exchanger 10 according to a second embodiment will be described. Hereinafter, differences from the heat exchanger 10 of the first embodiment will be mainly described.

Figure 4:
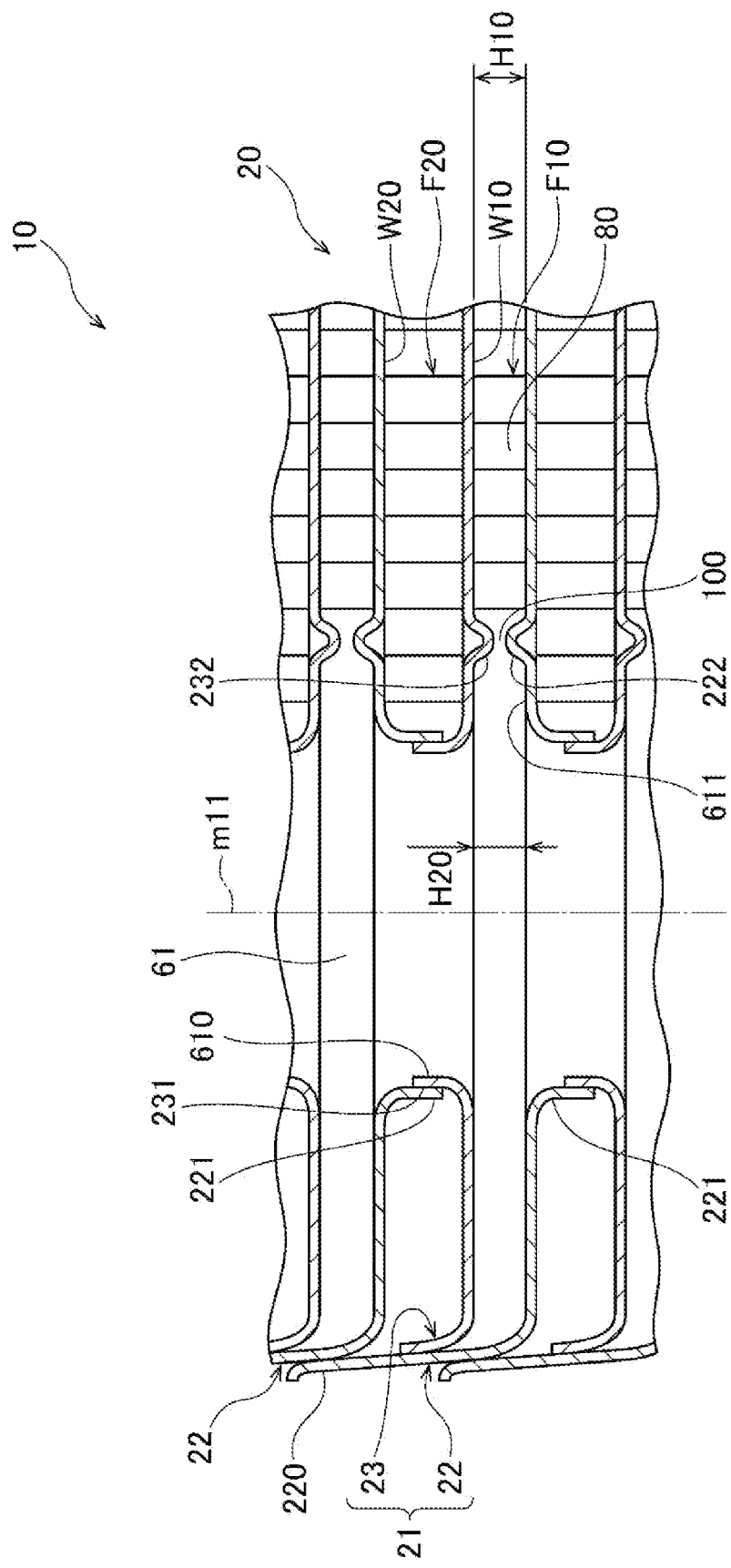
FIG. 4 is a cross-sectional view illustrating a heat exchanger according to a second embodiment.

As shown in FIG. 4, in the heat exchanger 10 of the present embodiment, the burring portion 221 of the outer plate 22 and the burring portion 231 of the inner plate 23 are joined to each other by brazing so as to partition and define the first refrigerant tank portion 61. Further, due to the joint structure of the burring portions 221, 231 the refrigerant passage W10 is communicated with the first refrigerant tank portion 61, while the cooling water passage W20 is independent of the first refrigerant tank portion 61.

In the heat exchanger 10 of the present embodiment, the width H20 of the inflow port 611 formed in the peripheral wall 610 of the first refrigerant tank portion 61 is the same as the width H10 of the fin installation portion 80 of the refrigerant passage W10. The outer plate 22 and the inner plate 23 have respectively the protrusion 223 and the protrusion 232 so that the cross-sectional area of the passage is reduced in the middle of the refrigerant passage W10 from the inflow port 611 to the fin installation portion 80. In the present embodiment, the protrusions 223 and 232 form the passage reduction portion 100 narrower than the width H20 of the fin installation portion 80 in the plate stacking direction Z.

According to the second embodiment, it is possible to obtain the effects described in the above item (1).

OTHER EMBODIMENTS

The preceding embodiments may be practiced in the following modes.

In each of the embodiments, the heat exchanger 10 may have both of the plate member 21 with the passage reduction portion 100 and the plate members 21 without the passage reduction portion 100. For example, in consideration of the fact that the refrigerant easily flows to the plate member 21 downstream of the first refrigerant tank portion 61, the passage reduction portion 100 is formed in the plate member 21 downstream of the first refrigerant tank portion 61, while the passage reduction portion 100 is not formed in the plate member 21 upstream of the first refrigerant tank portion 61.

It is possible to combine the passage reduction portion 100 formed by the burring portions 221 and 231 of the plates 22 and 23 of the first embodiment and the passage reduction portion 100 formed by the protrusions 222 and 232 of the plates 22 and 23.

The heat exchanger 10 according to each of the embodiments can also be applied to a stacked evaporator that exchanges heat between air and refrigerant.

The present disclosure is not limited to the specific examples described above. The specific examples described above which have been appropriately modified in design by those skilled in the art are also encompassed in the scope of the present disclosure so far as the modified specific examples have the features of the present disclosure. Each element included in each of the specific examples described above, and the placement, condition, shape, and the like of the element are not limited to those illustrated, and can be modified as appropriate. Each element included in each of the specific examples described above can be appropriately combined together as long as there is no technical contradiction.

What is claimed is:

1. A heat exchanger comprising:
a plurality of plate members stacked with each other in a stacking direction so as to define a plurality of first passages and a plurality of second passages, heat being exchanged between a refrigerant flowing through the first passage and a fluid flowing through the second passage;
a fin arranged in a fin installation portion in the first passage; and
a tubular tank portion formed to penetrate the plurality of plate members in the stacking direction, wherein
each of the plate members includes two plates joined with each other,
each of the two plates has a burring portion to form a peripheral wall of the tank portion,
an inflow port is formed between two burring portions of the two plates so as to allow the refrigerant to flow into the first passage,
a passage reduction portion is formed at the inflow port, and is narrower than a width of the fin installation portion in the stacking direction, and
one of the two plates includes a first protrusion located adjacent to a first burring portion, the other of the two plates includes a second protrusion located adjacent to a second burring portion, and the first protrusion and the second protrusion are joined to each other.

2. The heat exchanger according to claim 1, wherein the inflow port and the passage reduction portion are defined between a tip end of the first burring portion and a tip end of the second burring portion.

3. The heat exchanger according to claim 1, wherein the inflow port has a width, the inflow port width is narrower than the width of the fin installation portion.

4. The heat exchanger according to claim 1, wherein the inflow port has a width, a dimension of the inflow port width is the same as a dimension of the width of the fin installation portion.

* * * * *